United States Patent
Suzuki et al.

(10) Patent No.: US 9,526,157 B2
(45) Date of Patent: Dec. 20, 2016

(54) LIGHT SOURCE APPARATUS, DISCHARGE LAMP DRIVING METHOD, AND PROJECTOR

(75) Inventors: Junichi Suzuki, Chino (JP); Satoshi Kito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 925 days.

(21) Appl. No.: 13/549,579

(22) Filed: Jul. 16, 2012

(65) Prior Publication Data

US 2013/0027674 A1 Jan. 31, 2013

(30) Foreign Application Priority Data

Jul. 25, 2011 (JP) ................. 2011-161937

(51) Int. Cl.
| | |
|---|---|
| *H05B 41/24* | (2006.01) |
| *H05B 41/36* | (2006.01) |
| *H05B 37/02* | (2006.01) |
| *G05F 1/52* | (2006.01) |
| *H05B 41/292* | (2006.01) |
| *H05B 41/288* | (2006.01) |
| *G03B 21/20* | (2006.01) |

(52) U.S. Cl.
CPC ...... *H05B 41/2928* (2013.01); *H05B 41/2885* (2013.01); *G03B 21/2026* (2013.01); *Y02B 20/202* (2013.01); *Y02B 20/208* (2013.01)

(58) Field of Classification Search
CPC .......... H05B 41/24; H05B 41/36; G03B 21/14
USPC .......... 315/209 R, 287, 194, 291, 82; 353/85
See application file for complete search history.

(56) References Cited

U.S. PATENT DOCUMENTS

| | | | | |
|---|---|---|---|---|
| 5,680,011 | A * | 10/1997 | Makishima | 315/3 |
| 6,043,614 | A * | 3/2000 | Tessnow et al. | 315/291 |
| 6,369,511 | B1 * | 4/2002 | Matsuoka et al. | 315/3.5 |
| 8,237,378 | B2 * | 8/2012 | Terashima | 315/307 |
| 8,581,506 | B2 * | 11/2013 | Yamauchi et al. | 315/224 |
| 2006/0066261 | A1 * | 3/2006 | Rahmane et al. | 315/291 |
| 2006/0290292 | A1 * | 12/2006 | Li et al. | 315/194 |
| 2008/0024853 | A1 * | 1/2008 | Tanaka et al. | 359/238 |
| 2010/0109533 | A1 * | 5/2010 | Komatsu | H05B 41/2883 315/119 |
| 2010/0134032 | A1 | 6/2010 | Martin et al. | |
| 2010/0244720 | A1 | 9/2010 | Tsukamoto et al. | |
| 2012/0074858 | A1 * | 3/2012 | Ono | H05B 41/2883 315/209 R |

FOREIGN PATENT DOCUMENTS

| | | |
|---|---|---|
| CN | 101523997 A | 9/2009 |
| JP | 2007-115534 A | 5/2007 |
| JP | 2010-238526 A | 10/2010 |

* cited by examiner

*Primary Examiner* — Douglas W Owens
*Assistant Examiner* — Wei Chan
(74) *Attorney, Agent, or Firm* — ALG Intellectual Property, LLC (57) ABSTRACT

A light source apparatus includes a discharge lamp including a light-emitting container having a cavity in which a discharge medium is enclosed, and a pair of electrodes disposed such that respective tip portions thereof oppose each other in the cavity, and a driving unit that supplies a driving current to the pair of electrodes. The driving current is generated by modulating amplitude of alternating current having a frequency not lower than 1 kHz and not higher than 10 GHz, such that a first section and a second section in which the amplitude is smaller than in the first section are alternately repeated.

17 Claims, 7 Drawing Sheets

LIGHT SOURCE APPARATUS, DISCHARGE LAMP DRIVING METHOD, AND PROJECTOR

BACKGROUND

1. Technical Field

The present invention relates to a light source apparatus, a driving method of a discharge lamp, and a projector.

2. Related Art

Discharge lamps such as a high-pressure mercury lamp and a metal halide lamp are currently employed as a light source of a projector.

Such discharge lamps are driven by supplying, for example, a high-frequency alternating current as the driving current. Such a driving method provides stabilized discharge performance and prevents blackening or devitrification of the discharge lamp main portion thereby suppressing degradation of the life span of the discharge lamp, for example as described in JP-A-2007-115534.

However, while the discharge lamp is turned on arc discharge takes place between a pair of electrodes, and the electrodes melt because of a high temperature and thus the clearance between the electrodes become wider. In the case where the discharge lamp is employed for a projector, it is preferable to maintain a narrow clearance between the electrodes so as to illuminate a smaller region, in order to achieve a higher utilization efficiency of the light, and the increase of the clearance between the electrodes is not desirable since it leads to lower utilization efficiency of the light. The increase of the clearance between the electrodes also incurs fluctuation of the impedance therebetween, and therefore although the discharge lamp provides high efficiency during an initial period of use, impedance mismatch occurs with the lapse of time, which leads to an increase in reactive power and degradation of efficiency.

On the other hand, a low-frequency alternating current that presents a rectangular waveform (square AC) is also employed as the driving current. With such a driving method, a projection is formed on each of the pair of electrodes with the use of the discharge lamp, which contributes to maintain the narrow clearance between the electrodes.

In this case, however, the discharge lamp main portion is prone to suffer blackening and devitrification, resulting in reduced life span of the discharge lamp.

Accordingly, the present inventor has developed a driving method including modulating amplitude of alternating current of a frequency not lower than 1 kHz and not higher than 10 GHz, and supplying the amplitude-modulated alternating current to the discharge lamp as driving current, thereby turning on the discharge lamp.

The driving method suppresses the blackening of the discharge lamp, and allows the clearance between the electrodes to be maintained constant while driving the discharge lamp, in the case where the luminance of the discharge lamp remains unchanged.

However, in the case where the discharge lamp is of a type that allows the luminance to be controlled, the clearance between the electrodes may become narrower or wider depending on the luminance.

SUMMARY

An advantage of some aspects of the invention is the provision of a light source apparatus and a driving method of a discharge lamp capable of suppressing blackening of the discharge lamp and maintaining a constant clearance between electrodes irrespective of the luminance of the discharge lamp, and a projector that utilizes the light source apparatus and the driving method.

In an aspect, the invention provides a light source apparatus including a discharge lamp that includes a light-emitting container having a cavity in which a discharge medium is enclosed and a pair of electrodes disposed such that respective tip portions thereof oppose each other in the cavity; and a driving unit that supplies a driving current to the pair of electrodes. The driving current is generated by modulating amplitude of alternating current having a frequency not lower than 1 kHz and not higher than 10 GHz, such that a first section and a second section in which the amplitude is smaller than in the first section are alternately repeated. The driving unit is configured so as to control the amplitude of the alternating current to thereby control luminance of the discharge lamp, and a ratio B/A is set in a range between 10% and 90% on the basis of the luminance of the discharge lamp, where A represents a total of the period corresponding to one of the first sections and one of the second sections, and B represents the period corresponding to one of the first sections.

With the foregoing configuration, the blackening of the discharge lamp can be suppressed and the clearance between the electrodes can be maintained constant while the discharge lamp is driven, irrespective of the luminance of the discharge lamp.

Preferably, the ratio B/A may be set at a value farther from 50% the lower the luminance of the discharge lamp is.

Such an arrangement assures growth of a projection on the electrodes.

Preferably, the ratio B/A may be in a range between 45% and 55% when the luminance of the discharge lamp is highest.

Such an arrangement further assures the growth of the projection on the electrodes.

Preferably, a ratio b/a may be constant irrespective of the luminance of the discharge lamp, where "a" represents an average amplitude of the alternating current in the first section, and "b" represents an average amplitude of the alternating current in the second section.

Such an arrangement further assures the growth of the projection on the electrodes.

Preferably, the modulation frequency may be constant irrespective of the luminance of the discharge lamp.

Such an arrangement further assures the growth of the projection on the electrodes.

Preferably, the amplitude of the alternating current may be constant in the first section.

Such an arrangement further assures the growth of the projection on the electrodes.

Preferably, the amplitude of the alternating current may be constant in the second section.

Such an arrangement further assures the growth of the projection on the electrodes.

Preferably, the frequency of the alternating current may be not lower than 1 kHz and not higher than 20 kHz, or not lower than 3 MHz and not higher than 10 GHz.

Such an arrangement prevents the discharge performance from becoming unstable because of acoustic resonance.

Preferably, a projection may be formed on a tip portion of each of the pair of electrodes while the discharge lamp is turned on by the driving current, because of fluctuation of temperature of the pair of electrodes.

With such an arrangement, the clearance between the electrodes can be maintained constant, while the discharge lamp is driven.

Preferably, the ratio B/A may be set in accordance with the luminance of the discharge lamp, such that the length of the projections remains constant.

Such an arrangement further assures that the clearance between the electrodes can be maintained constant, while the discharge lamp is driven.

In another aspect, the invention provides a driving method of a discharge lamp including a light-emitting container having a cavity in which a discharge medium is enclosed and a pair of electrodes disposed such that respective tip portions thereof oppose each other in the cavity. The method includes generating an alternating current of a frequency not lower than 1 kHz and not higher than 10 GHz; controlling amplitude of the alternating current to thereby control luminance of the discharge lamp; modulating the amplitude of the alternating current in accordance with the luminance of the discharge lamp thereby generating a driving current, such that a first section and a second section in which the amplitude is smaller than in the first section are alternately repeated, and that a ratio B/A is set in a range between 10% and 90% on the basis of the luminance of the discharge lamp, where A represents a total of the period corresponding to one of the first sections and one of the second sections, and B represents the period corresponding to one of the first sections; and supplying the driving current to the pair of electrodes.

With the foregoing method, the blackening of the discharge lamp can be suppressed and the clearance between the electrodes can be maintained constant while the discharge lamp is driven, irrespective of the luminance of the discharge lamp.

In still another aspect, the invention provides a projector including a light source apparatus that emits a light; a modulation unit that modulates the light emitted from the light source apparatus on the basis of image data; and a projecting unit that projects the light modulated by the modulation unit. The light source apparatus includes a discharge lamp including a light-emitting container having a cavity in which a discharge medium is enclosed and a pair of electrodes disposed such that respective tip portions thereof oppose each other in the cavity, and a driving unit that supplies a driving current to the pair of electrodes. The driving current is generated by modulating amplitude of alternating current having a frequency not lower than 1 kHz and not higher than 10 GHz, such that a first section and a second section in which the amplitude is smaller than in the first section are alternately repeated. The driving unit is configured so as to control the amplitude of the alternating current to thereby control luminance of the discharge lamp, and a ratio B/A is set in a range between 10% and 90% on the basis of the luminance of the discharge lamp, where A represents a total of the period corresponding to one of the first sections and one of the second sections, and B represents the period corresponding to one of the first sections.

With the foregoing configuration, the blackening of the discharge lamp can be suppressed and the clearance between the electrodes can be maintained constant while the discharge lamp is driven, irrespective of the luminance of the discharge lamp. Consequently the power consumption can be reduced, and stabilized high-quality images can be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, preferred embodiments of a light source apparatus, a driving method of a discharge lamp, and a projector will be described referring to the drawings.

Light Source Apparatus

Figure 1:
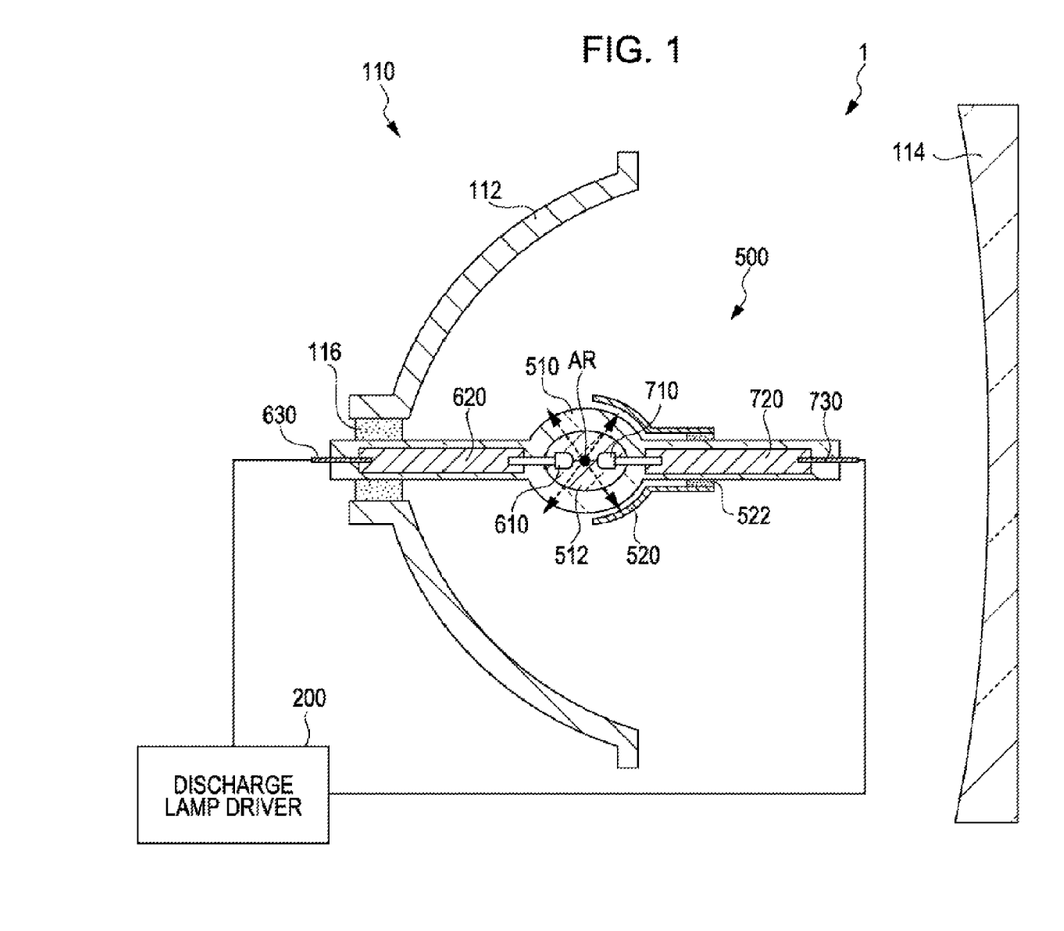
FIG. 1 is a cross-sectional view, partially illustrated as a block diagram, showing a light source apparatus according to an embodiment of the invention.
Figure 2:
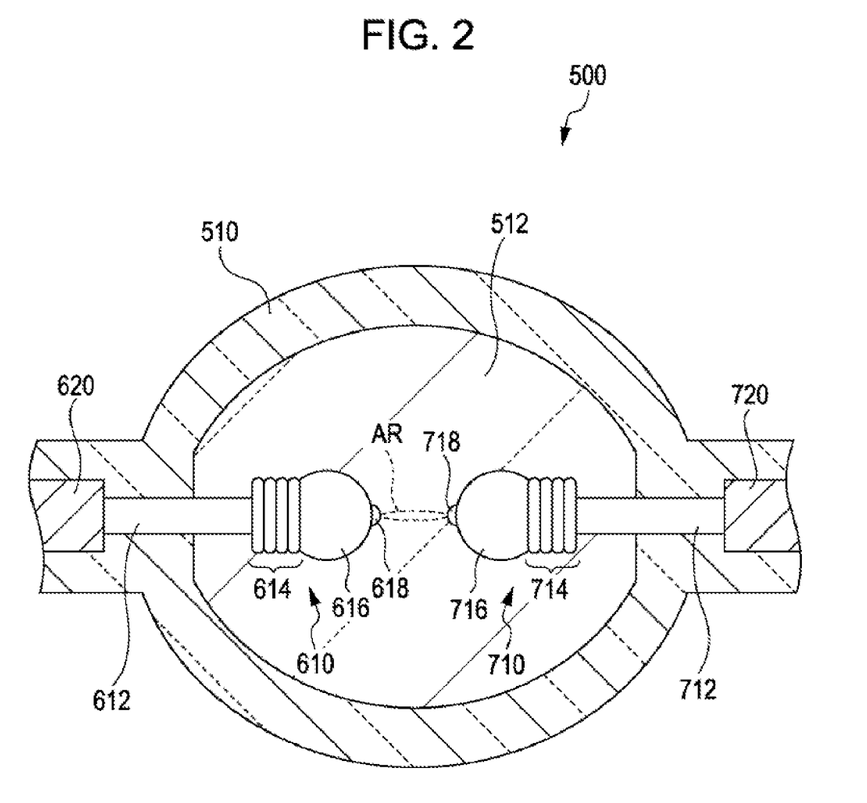
FIG. 2 is an enlarged cross-sectional view of the discharge lamp of the light source apparatus shown in FIG. 1.
Figure 3:
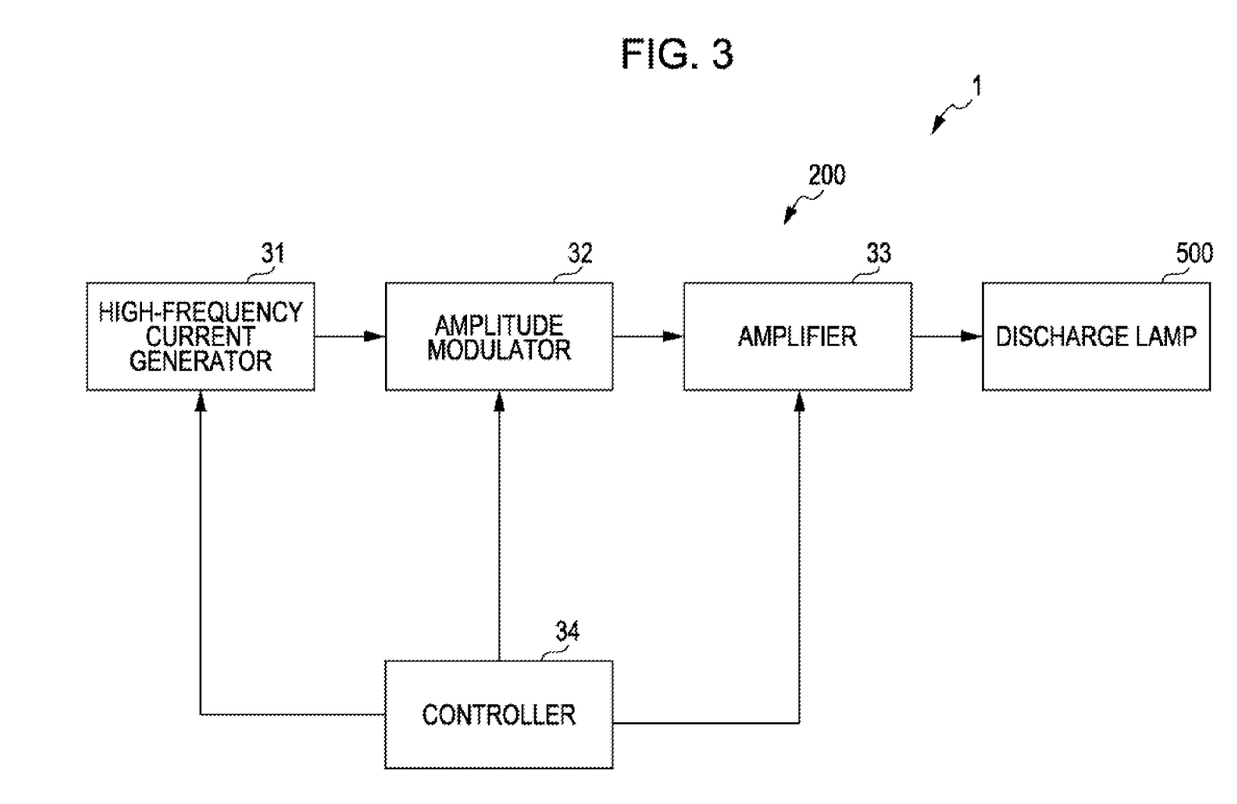
FIG. 3 is a block diagram showing a configuration of a discharge lamp driver of the light source apparatus shown in FIG. 1.
Figure 4A:
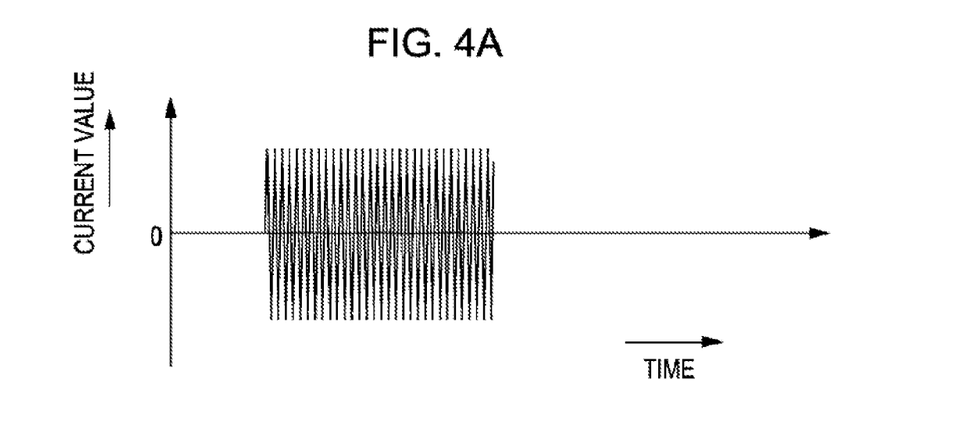
FIGS. 4A and 4B are time charts showing alternating current and driving current generated by the discharge lamp driver of the light source apparatus shown in FIG. 1.
Figure 4B:
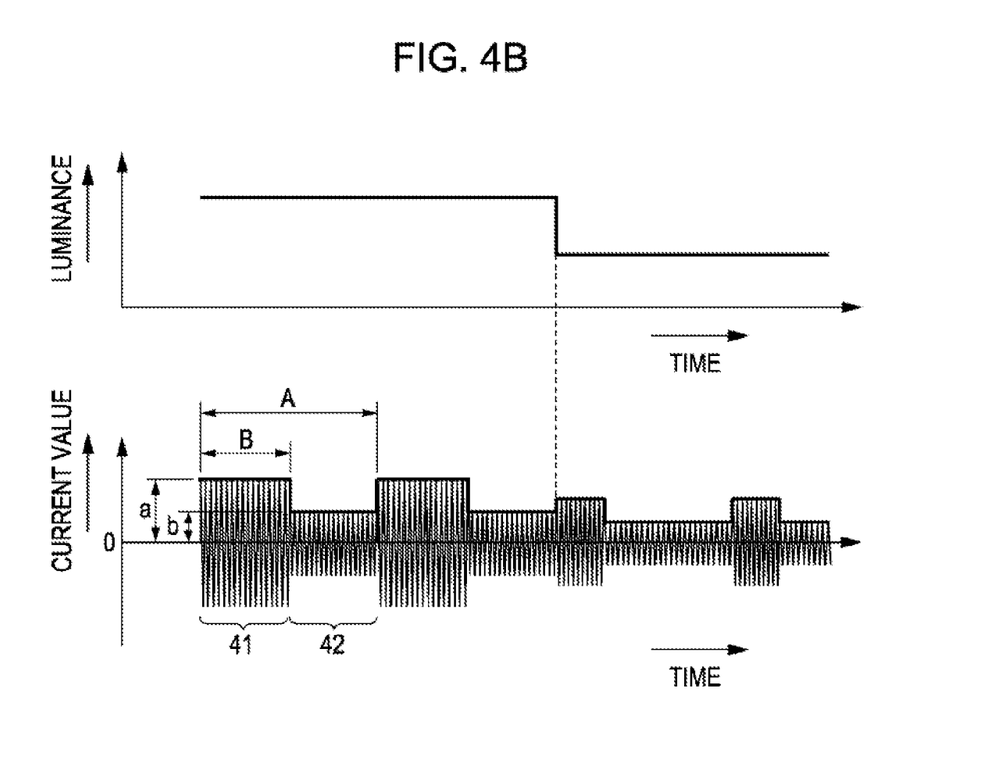

FIG. 1 is a cross-sectional view with a partial block diagram, showing a light source apparatus according to a first embodiment of the invention. FIG. 2 is an enlarged cross-sectional view of the discharge lamp of the light source apparatus shown in FIG. 1. FIG. 3 is a block diagram showing a configuration of a discharge lamp driver of the light source apparatus shown in FIG. 1. FIGS. 4A and 4B are time charts showing alternating current and driving current generated by the discharge lamp driver of the light source apparatus shown in FIG. 1. In FIG. 2, a sub reflection mirror shown in FIG. 1 is excluded.

As shown in FIG. 1, the light source apparatus 1 includes a light source unit 110 having a discharge lamp 500, and a discharge lamp driver 200 (driving unit) that drives the discharge lamp 500. The discharge lamp 500 performs discharge upon receipt of power supplied by the discharge lamp driver 200, so as to emit a light.

The light source unit 110 includes a discharge lamp 500, a main reflection mirror 112 having a concave reflecting surface, and a parallelizing lens 114 that converts the emitted light into a generally parallel light. The main reflection mirror 112 and the discharge lamp 500 are coupled via an inorganic adhesive 116. The surface of the main reflection mirror 112 on the side of the discharge lamp 500 (inner surface) is formed as a reflecting surface which, according to FIG. 1, has a spheroidal shape.

The shape of the reflecting surface of the main reflection mirror 112 is not limited to the spheroid but may be a different shape such as a paraboloid of revolution. In the case where the reflecting surface of the main reflection mirror 112 is formed in the paraboloid of revolution, placing the light emitting position of the discharge lamp 500 at the focal point of the paraboloid of revolution allows the parallelizing lens 114 to be excluded.

The discharge lamp 500 includes a discharge lamp main unit 510 and a sub reflection mirror 520 having a concave reflecting surface. The discharge lamp main unit 510 and the sub reflection mirror 520 are coupled via an inorganic adhesive 522. The surface of the sub reflection mirror 520 on the side of the discharge lamp 500 (inner surface) is formed as a reflecting surface which, according to FIG. 1, constitutes a spherical surface.

A discharge medium to be subsequently described is enclosed in a central portion of the discharge lamp main unit 510, and thus a light-emitting container including an airtightly closed discharge chamber 512 (cavity) is formed. At least a portion of the discharge lamp main unit 510 facing the discharge chamber 512 is light-transmissive. Examples of the material of the discharge lamp main unit 510 include a glass such as quartz glass, and a light-transmissive ceramic.

The discharge lamp main unit 510 includes a pair of electrodes 610, 710, a pair of conductive connectors 620, 720, and a pair of electrode terminals 630, 730. The connector 620 electrically connects the electrode 610 and the electrode terminal 630. Likewise, the connector 720 electrically connects the electrode 710 and the electrode terminal 730.

The electrodes 610, 710 are accommodated in the discharge chamber 512. More specifically, the electrodes 610, 710 are disposed such that the respective tip portions oppose each other with a predetermined clearance therebetween, in the discharge chamber 512 of the discharge lamp main unit 510.

It is preferable that the clearance between the electrodes, i.e., a shortest distance between the electrode 610 and the electrode 710, be not shorter than 1 μm and not longer than 5 mm, and more preferably not shorter than 500 μam and not longer than 1.5 mm.

As shown in FIG. 2, the electrode 610 includes a core 612, a coil portion 614, and a main body 616. Before being mounted in the discharge lamp main unit 510, the electrode 610 is formed through winding an electrode material (tungsten or the like) on the core 612 so as to form the coil portion 614, and hot-melting the coil portion 614. Through such a process, the main body 616 at the tip portion of the electrode 610 acquires a large thermal capacity. Likewise the electrode 710 includes a core 712, a coil portion 714, and a main body 716, and is formed through the same process as the electrode 610.

Projections 618, 718 are not present on the main bodies 616, 716 before the discharge lamp 500 is first turned on, however when the discharge lamp 500 is turned on even once under a subsequently described condition, the projections 618, 718 are formed on the tip portion of the main bodies 616, 716, respectively. The projections 618, 718 are maintained while the discharge lamp 500 is lit, and also remain after the discharge lamp 500 is turned off.

Examples of the material of the electrodes 610, 710 include a metal having a high melting point, such as tungsten.

A discharge medium is enclosed in the discharge chamber 512. The discharge medium contains, for example, a gas for starting the discharge and a gas that contributes to light emission. Naturally, the discharge medium may contain other types of gas.

Examples of the gas for starting the discharge include noble gases such as neon, argon, and xenon. Examples of the gas that contributes to light emission include vapor of mercury, metal halide, and the like. Other types of gas can be exemplified by those that serve to suppress blackening. More specifically, examples of the gas that suppresses the blackening include halogens such as bromine, halogen compounds such as hydrogen bromide, and the vapor thereof.

It is preferable that the pressure in the discharge lamp main unit 510 when the discharge lamp is turned on be not lower than 0.1 atm and not higher than 300 atm, and more preferably not lower than 50 atm and not higher than 300 atm.

The electrode terminals 630, 730 of the discharge lamp 500 are each connected to an output terminal of the discharge lamp driver 200. The discharge lamp driver 200 serves to supply a driving current including an alternating current AC of a high frequency to the discharge lamp 500. In other words, the discharge lamp driver 200 supplies the driving current to the electrodes 610, 710 through the electrode terminals 630, 730, thus supplying power to the discharge lamp 500. When the driving current is supplied to the electrodes 610, 710, arc discharge (arc AR) takes place between the tip portions of the pair of electrodes 610, 710 in the discharge chamber 512. The light generated by the arc discharge (discharge light) is emitted in all directions from the position where the arc AR has taken place (discharge position). The sub reflection mirror 520 reflects the light emitted in the direction of one of the electrodes 710 toward the main reflection mirror 112. Reflecting thus the light emitted in the direction of the electrodes 710 toward the main reflection mirror 112 allows the light emitted in the direction of the electrodes 710 to be efficiently utilized. Although the discharge lamp 500 includes the sub reflection mirror 520 in this embodiment, the sub reflection mirror 520 may be excluded from the discharge lamp 500.

The discharge lamp driver 200 will now be described.

As shown in FIG. 3, the discharge lamp driver 200 includes a high-frequency current generator 31 that generates alternating current of a high frequency, an amplitude modulator (modulation unit) 32, an amplifier 33 in which the amplification factor is variable, and a control unit 34, and serves to supply the amplitude-modulated alternating current to the pair of electrodes 610, 710 of the discharge lamp 500, as the driving current. The control unit 34 controls the overall operation of the discharge lamp driver 200, by controlling the high-frequency current generator 31, the amplitude modulator 32 and the amplifier 33.

In the discharge lamp driver 200, the amplitude modulator 32 modulates the amplitude of the alternating current generated by the high-frequency current generator 31 as shown in FIG. 4A, such that, as shown in FIG. 4B, a first section 41 and a second section 42 in which the amplitude of the driving current is smaller than in the first section 41 are alternately repeated. Then the amplifier 33 amplifies the alternating current to thereby generate and output the alternating current that serves as the driving current for the discharge lamp. The driving current thus outputted by the discharge lamp driver 200 is supplied to the pair of electrodes 610, 710 of the discharge lamp 500.

Once the driving current is supplied, the arc discharge takes place between the tip portions of the pair of electrodes 610, 710 so that the discharge lamp 500 is turned on, as described above.

In the light source apparatus 1, the discharge lamp 500 is turned on by the driving current of subsequently described conditions, so that the temperature of the electrodes 610, 710 fluctuates while the discharge lamp 500 is turned on, and the projections 618, 718 are formed on the tip portions of the electrodes 610, 710 and maintained thereon, by such temperature fluctuation.

More specifically, in the first section 41 of the driving current, a part of the tip portions of the electrodes 610, 710 melts because of an increase in temperature, and the molten electrode material concentrates at the tip portions of the electrodes 610, 710 owing to surface tension. In the second section 42, the temperature of the electrodes 610, 710 falls and hence the molten electrode material coagulates. Thus, the projections 618, 718 grow because of the repetition of the concentration of the molten electrode material at the tip portions of the electrodes 610, 710 and the coagulation of the molten electrode material. Therefore, the clearance between the electrodes can be maintained constant. In the light source apparatus 1 thus configured, the discharge lamp 500 can be efficiently driven.

In addition, since the driving current includes the high frequency alternating current, the blackening of the discharge lamp 500 can be suppressed, which contributes to extending the life span of the discharge lamp 500.

The discharge lamp driver 200 also causes the amplifier 33 to control the magnitude (amplitude) of the driving current to thereby control the luminance of the discharge lamp 500, and the control unit 34 determines a ratio B/A of the driving current waveform on the basis of the luminance of the discharge lamp 500, as will be subsequently described (see FIG. 4B). Further, the control unit 34 is configured to control the amplification factor of the amplifier 33, and when the control unit 34 increases the amplification factor of the amplifier 33 the amplitude of the driving current is increased, and hence the luminance of the discharge lamp 500 becomes higher. Conversely, when the control unit 34 decreases the amplitude factor of the amplifier 33 the amplitude of the driving current is decreased, and hence the luminance of the discharge lamp 500 becomes lower.

As described above, the driving current includes the first section 41 and the second section 42 in which the amplitude of the alternating current is different. Accordingly, an average of the amplitude of the driving current, obtained from the amplitude of the alternating current in the first section 41 and the amplitude of the alternating current in the second section 42, determines the luminance of the discharge lamp 500. In other words, the amplitude of the driving current controlling the luminance of the discharge lamp 500 may be expressed as the average amplitude of the alternating current constituting the driving current. Here, the amplitude of the driving current according to this embodiment may be expressed as a time average of the amplitude of the alternating current in the first section 41 and the amplitude of the alternating current in the second section 42.

The rated power of the discharge lamp 500 is not specifically limited and may be appropriately determined depending on the purpose and other factors, however a preferable range is between 10 W and 5 kW, and more preferably between 100 W and 500 W.

A preferable range of the frequency of the alternating current is broadly between 1 kHz and 10 GHz, but it is preferable that the frequency be between 1 kHz and 100 kHz or between 3 MHz and 10 GHz, and more preferably between 1 kHz and 20 kHz or between 3 MHz and 3 GHz.

Although the electrode temperature becomes higher when the electrodes 610, 710 act as an anode compared with the case of acting as a cathode, setting the frequency of the alternating current at a level not lower than the lower limit specified above prevents the fluctuation of the electrode temperature during the relevant cycle of the alternating current.

However, in the case where the frequency of the alternating current is lower than the lower limit, the temperature of the electrodes 610, 710 fluctuates at every cycle of the driving current, which disables the projections 618, 718 from being formed or maintained, and may lead to blackening. Conversely, setting the frequency at a level higher than the upper limit results in an increase in cost.

In the case where the frequency of the alternating current is between 20 kHz and 3 MHz, the discharge performance may become unstable because of acoustic resonance, depending on other conditions.

Although the modulation frequency of the driving current is not specifically limited and may be appropriately determined depending on related conditions, however a preferable range is between 10 Hz and 1000 Hz, and more preferably between 50 Hz and 500 Hz.

In the case where the modulation frequency is lower than the lower limit specified above, the projections 618, 718 may excessively grow and bend downward depending on other conditions. Conversely, in the case where the modulation frequency is higher than the upper limit, the projections 618, 718 may fail to be formed, depending on other conditions. The lower the modulation frequency is, the more efficiently the projections 618, 718 grow.

In this embodiment, the amplitude of the alternating current AC is set to be constant, in the first section 41 and the second section 42 respectively. Such an arrangement further assures the growth of the projections 618, 718 on the electrodes 610, 710.

Here, an average amplitude of the alternating current in the first section will be denoted as "a" and an average amplitude of the alternating current in the second section will be denoted as "b", as shown in FIG. 4B. A ratio b/a is not specifically limited and may be appropriately set depending on related conditions, however it is preferable that the ratio b/a be greater than 0 and not greater than 90%, and more preferably greater than 0 and not greater than 50%.

In the case where the ratio b/a is higher than the upper limit specified above, the projections 618, 718 may fail to be formed, depending on other conditions. The lower the ratio b/a is, the more efficiently the projections 618, 718 grow.

In addition, a total of the period of the first section and the second section will be denoted as A and the period of the first section will be denoted as B, as shown in FIG. 4B. It is preferable that a ratio B/A is in a range between 10% and 90%, more preferably between 25% and 75%, and even more preferably between 45% and 55%.

In the case where the ratio B/A is lower than the lower limit specified above or higher than the upper limit, the projections 618, 718 fail to be formed. Here, the closer to 50% the ratio B/A is, the more efficiently the projections 618, 718 grow, and the projections 618, 718 grow the most when the ratio B/A is 50%.

The control unit 34 determines the ratio B/A of the driving current waveform within the foregoing range in accordance with the luminance of the discharge lamp 500, i.e., the magnitude (average) of the driving current which is already known (see FIG. 4B). In this case, the ratio B/A is set in accordance with the luminance of the discharge lamp 500, such that the length of the projections 618, 718 remains constant. More specifically, the ratio B/A is set as a value farther from 50%, the lower the luminance of the discharge lamp 500 is. The value far from 50% may be greater or smaller than 50%.

In addition, it is preferable that the ratio B/A be between 45% and 55% when the luminance of the discharge lamp 500 is highest, and more preferably between 47.5% and 52.5%. Such a setting assures the formation of the projections 618, 718 on the electrodes 610, 710, and allows the length of the projections 618, 718 to remain constant.

The modulation frequency of the driving current may be constant irrespective of the luminance of the discharge lamp 500, or may be set within the foregoing range in accordance with the luminance of the discharge lamp 500, i.e., the magnitude (amplitude) of the driving current. In the case of setting the modulation frequency in accordance with the luminance of the discharge lamp 500, the modulation frequency is set higher, the lower the luminance of the discharge lamp 500 is. Such an arrangement allows the length of the projections 618, 718 to remain constant.

The ratio b/a may be constant irrespective of the luminance of the discharge lamp 500, or may be set within the foregoing range in accordance with the luminance of the discharge lamp 500, i.e., the magnitude of the driving current. In the case of setting the ratio b/a in accordance with the luminance of the discharge lamp 500, the ratio b/a is set higher, the lower the luminance of the discharge lamp 500 is. Such an arrangement allows the length of the projections 618, 718 to remain constant.

Further, it is preferable to set the ratio B/A on the basis of the modulation frequency, the ratio b/a, and the rated power of the discharge lamp 500. Such an arrangement further assures the growth of the projections 618, 718 on the electrodes 610, 710.

As described thus far, the light source apparatus 1 suppresses the blackening of the discharge lamp 500 thereby extending the life span thereof. In addition, the light source apparatus 1 allows the projections 618, 718 to be formed on the electrodes 610, 710 and the clearance between electrodes to be maintained constant irrespective of the luminance of the discharge lamp 500, thus efficiently driving the discharge lamp 500.

Although the light source apparatus and the driving method of the discharge lamp according to the invention have been described on the basis of the illustrated embodiment, the invention is in no way limited to the embodiment, and the configuration of the constituents may be modified as desired as long as an equivalent function can be performed. Further, an optional constituent may be added to the invention.

Although the modulation frequency, the ratio b/a, and the ratio B/A of the driving current are constant in the foregoing embodiment, the modulation frequency, the ratio b/a, and the ratio B/A of the driving current may vary with the lapse of time according to the invention.

Although the modulation frequency, the ratio b/a, and the ratio B/A of the driving current are constant when the luminance is constant in the foregoing embodiment, the modulation frequency, the ratio b/a, and the ratio B/A of the driving current may vary with the lapse of time according to the invention.

In addition, although the amplitude of the alternating current is constant respectively in the first section 41 and the second section 42 in the foregoing embodiment, the amplitude of the alternating current may vary with the lapse of time in either of the first section 41 and the second section 42, according to the invention. Otherwise, the amplitude of the alternating current may vary with the lapse of time in both of the first section 41 and the second section 42, according to the invention.

First, examples of the driving current will be described, in which the amplitude of the alternating current is constant in the second section 42 but varying with the lapse of time in the first section 41.

FIGS. 5A to 5F are diagrams showing envelopes of different driving currents.

Figure 5A:
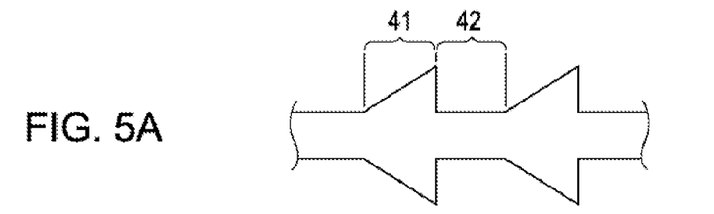
FIGS. 5A to 5F are diagrams showing envelopes of different driving currents.

In the example of the envelope of the driving current shown in FIG. 5A, the envelope corresponding to the driving current of positive values (hereinafter, simply "envelope") is inclined upward with the lapse of time (amplitude of the alternating current is gradually increasing) in the first section 41. In other words, the envelope assumes a linear form having a positive inclination.

Figure 5B:
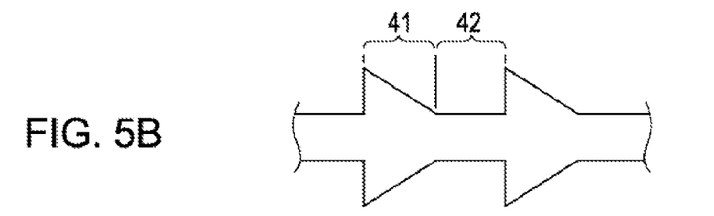

In the example shown in FIG. 5B, the envelope is inclined downward with the lapse of time (amplitude of the alternating current is gradually decreasing) in the first section 41. In other words, the envelope assumes a linear form having a negative inclination.

Figure 5C:
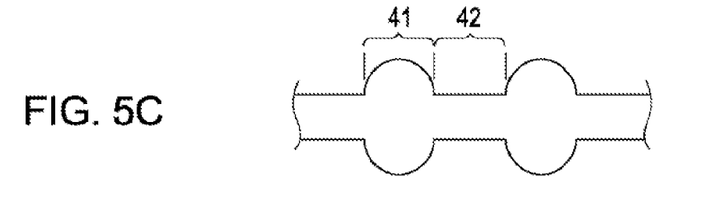

In the example shown in FIG. 5C, the envelope assumes a curved form protruding upward, in the first section 41.

Figure 5D:
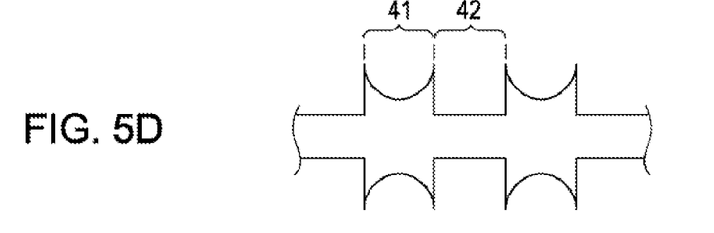

In the example shown in FIG. 5D, the envelope assumes a curved form protruding downward, in the first section 41.

Figure 5E:
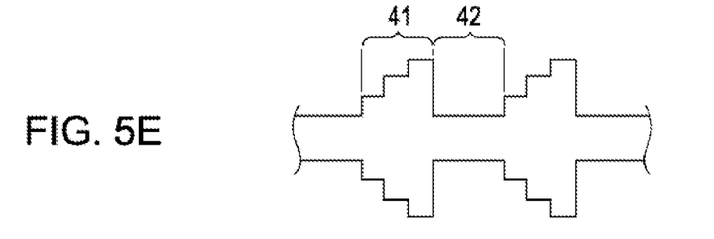

In the example shown in FIG. 5E, the envelope is ascending in stages with the lapse of time, in the first section 41.

Figure 5F:
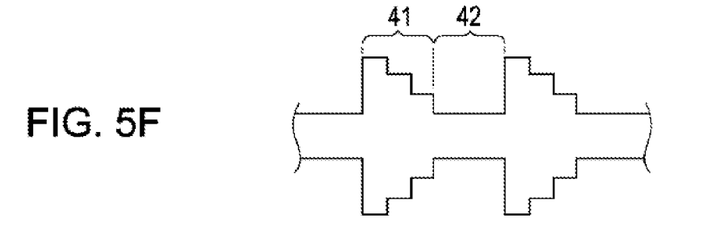

In the example shown in FIG. 5F, the envelope is descending in stages with the lapse of time, in the first section 41.

Here, in FIGS. 5A through 5F, the envelope corresponding to the driving current of negative values assumes a shape symmetric to the envelope corresponding to the positive driving current, with respect to the line representing the current value of "0".

Second, examples of the driving current will be described, in which the amplitude of the alternating current is constant in the first section 41 but varying with the lapse of time in the second section 42.

FIGS. 6A to 6F are diagrams showing the envelopes of different driving currents.

Figure 6A:
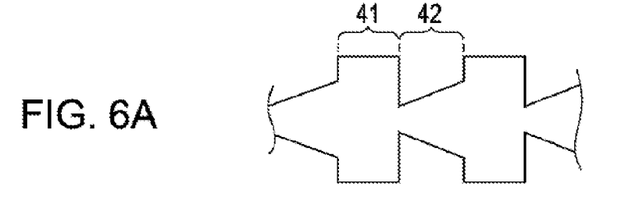
FIGS. 6A to 6F are diagrams showing envelopes of different driving currents.

In the example shown in FIG. 6A, the envelope is inclined upward with the lapse of time (amplitude of the alternating current is gradually increasing) in the second section 42. In other words, the envelope assumes a linear form having a positive inclination.

Figure 6B:
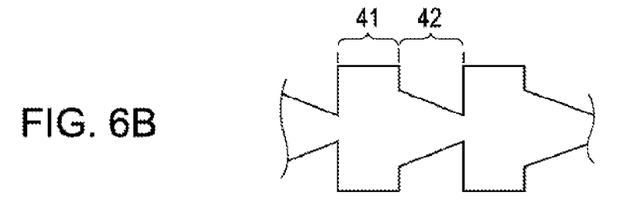

In the example shown in FIG. 6B, the envelope is inclined downward with the lapse of time (amplitude of the alternating current is gradually decreasing) in the second section 42. In other words, the envelope assumes a linear form having a negative inclination.

Figure 6C:
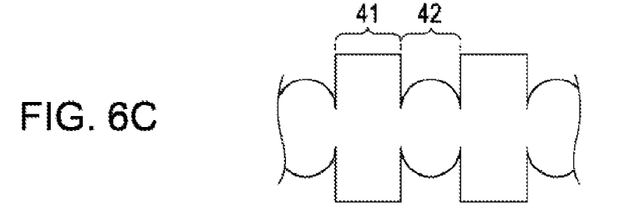

In the example shown in FIG. 6C, the envelope assumes a curved form protruding upward, in the second section 42.

Figure 6D:
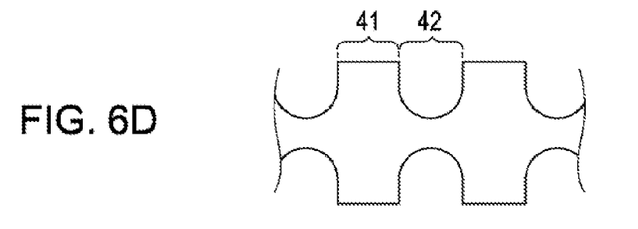

In the example shown in FIG. 6D, the envelope assumes a curved form protruding downward, in the second section 42.

Figure 6E:
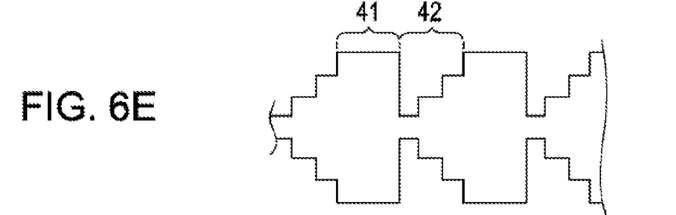

In the example shown in FIG. 6E, the envelope is ascending in stages with the lapse of time, in the second section 42.

Figure 6F:
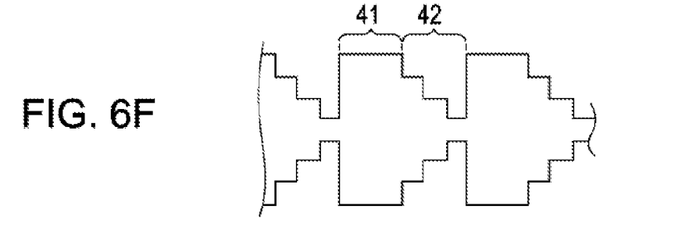

In the example shown in FIG. 6F, the envelope is descending in stages with the lapse of time, in the second section 42.

Here, in FIGS. 6A through 6F, the envelope corresponding to the driving current of negative values assumes a shape symmetric to the envelope corresponding to the positive driving current, with respect to the line representing the current value of "0".

Although examples of the driving current in which the amplitude of the alternating current varies with the lapse of time in both of the first section 41 and the second section 42 are not shown, such examples can be made up by combining as desired the envelope of the first section 41 shown in FIG. 5 and the envelope in the second section 42 shown in FIG. 6.

Further, although the amplifier 33 is provided at a posterior stage to the amplitude modulator 32 in the foregoing embodiment, the invention is not limited to such a configuration and the amplifier 33 may be provided at an anterior stage to the amplitude modulator 32.

Projector

Figure 7:
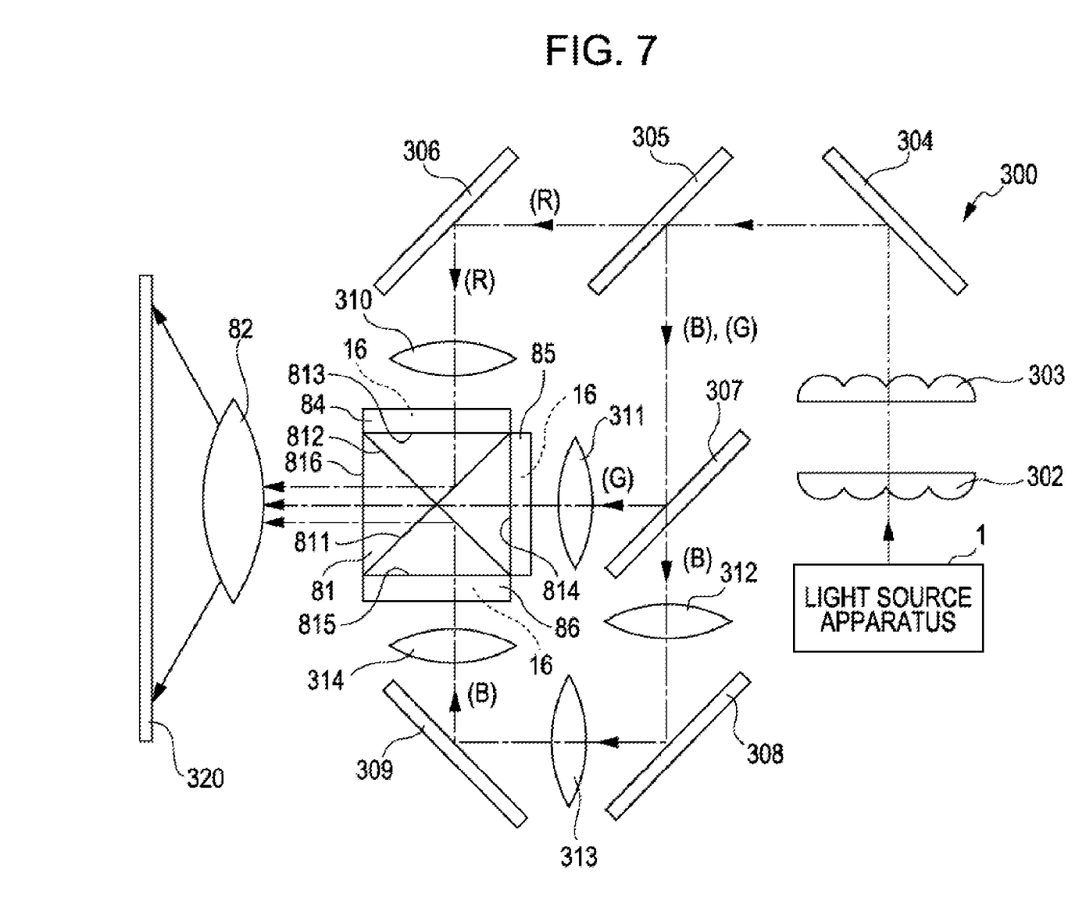
FIG. 7 is a schematic diagram showing a configuration of a projector according to an embodiment of the invention.

FIG. 7 is a schematic diagram showing a configuration of a projector according to an embodiment of the invention.

The projector 300 shown in FIG. 7 includes the aforementioned light source apparatus 1, an illumination optical system including integrator lenses 302, 303, a color separation optical system (light guide optical system), a liquid crystal light bulb 84 for red color, a liquid crystal light bulb 85 for green color, a liquid crystal light bulb 86 for blue color, a dichroic prism (color synthesis optical system) 81 including a dichroic mirror surface 811 that only reflects a red light and a dichroic mirror surface 812 that only reflects a blue light, and a projection lens (projection optical system) 82.

The color separation optical system includes mirrors 304, 306, and 309, a dichroic mirror 305 that reflects a blue light and a green light (transmits only a red light), a dichroic mirror 307 that only reflects a green light, a dichroic mirror 308 that only reflects a blue light, condenser lenses 310, 311, 312, 313, and 314.

The liquid crystal light bulb 85 includes an LCD panel 16, a first polarizing plate (not shown) attached to the light-receiving surface of the LCD panel 16, and a second polarizing plate (not shown) attached to the light-emitting surface of the LCD panel 16. The liquid crystal light bulbs 84 and 86 are also configured similarly to the liquid crystal light bulb 85. The respective LCD panels 16 of the liquid crystal light bulbs 84, 85, and 86 are connected to a driving circuit (not shown).

In the projector 300, the liquid crystal light bulbs 84, 85, and 86 and the driving circuit constitute the essential portion of a modulation unit that modulates the light emitted from the light source apparatus 1 on the basis of image data, and the projection lens 82 constitutes the essential portion of a projection unit that projects the light modulated by the modulation unit.

The thus-configured projector 300 operates as follows.

First, a white light (white light flux) emitted from the light source apparatus 1 passes through the integrator lenses 302, 303. The intensity (luminance distribution) of the white light is homogenized by the integrator lenses 302, 303.

After passing through the integrator lenses 302, 303, the white light is reflected by the mirror 304 to the left in FIG. 7. Out of the reflected light, blue light (B) and green light (G) are reflected downward in FIG. 7 by the dichroic mirror 305, and red light (R) passes through the dichroic mirror 305.

After passing through the dichroic mirror 305, the red light is reflected downward in FIG. 7 by the mirror 306, and such reflected light is shaped by the condenser lens 310 and enters the liquid crystal light bulb 84 for red color.

Out of the blue light and the green light reflected by the dichroic mirror 305, the green light is reflected by the dichroic mirror 307 to the left in FIG. 7, while the blue light passes through the dichroic mirror 307.

The green light reflected by the dichroic mirror 307 is shaped by the condenser lens 311 and enters the liquid crystal light bulb 85 for green color.

After passing through the dichroic mirror 307, the blue light is reflected by the dichroic mirror 308 to the left in FIG. 7, and such reflected light is reflected upward in FIG. 7 by the mirror 309. The blue light is then shaped by the condenser lenses 312, 313, and 314, and enters the liquid crystal light bulb 86 for blue color.

As described above, the white light emitted from the light source apparatus 1 is separated into the three primary colors of red, green, and blue by the color separation optical system, and each of the primary colors is guided to the corresponding liquid crystal light bulb 84, 85, and 86, thus to be incident thereon.

The pixels of the LCD panel 16 of the liquid crystal light bulb 84 are switched on and off under the control of the driving circuit operating on the basis of image signals corresponding to the red color. Likewise, the pixels of the LCD panel 16 of the liquid crystal light bulb 85 are switched on and off under the control of the driving circuit operating on the basis of image signals corresponding to the green color, and the pixels of the LCD panel 16 of the liquid crystal light bulb 86 are switched on and off under the control of the driving circuit operating on the basis of image signals corresponding to the blue color.

Thus, the red light, the green light, and the blue light are respectively modulated by the liquid crystal light bulbs 84, 85, and 86, so as to form the images each corresponding to the red color, the green color, and the blue color.

The image corresponding to the red color formed by the liquid crystal light bulb 84, in other words the red light from the liquid crystal light bulb 84 enters the dichroic prism 81 through an incident surface 813; is reflected to the left in FIG. 7 by the dichroic mirror surface 811; passes through the dichroic mirror surface 812; and is emitted through an output surface 816.

Likewise, the image corresponding to the green color formed by the liquid crystal light bulb 85, in other words the green light from the liquid crystal light bulb 85 enters the dichroic prism 81 through an incident surface 814; passes through the dichroic mirror surfaces 811, 812; and is emitted through the output surface 816.

Further, the image corresponding to the blue color formed by the liquid crystal light bulb 86, in other words the blue light from the liquid crystal light bulb 86 enters the dichroic prism 81 through an incident surface 815; is reflected to the left in FIG. 7 by the dichroic mirror surface 812; passes through the dichroic mirror surface 811; and is emitted through the output surface 816.

The lights of the respective colors outputted from the liquid crystal light bulbs 84, 85, and 86, in other words the respective images formed by the liquid crystal light bulbs 84, 85, and 86 are synthesized by the dichroic prism 81, so as to constitute a color image. This image is projected (extended projection) by the projection lens 82 onto a screen 320 placed at a predetermined position.

As described thus far, since the projector 300 includes the aforementioned light source apparatus 1, the projector 300 can display stable and high-quality images with reduced power consumption.

WORKING EXAMPLE

Specific working examples of the invention will be described here below.

Working Example 1

A light source apparatus as shown in FIG. 1, configured so as to be switched between high luminance and low luminance, was built with the following materials and conditions.

Material of discharge lamp main portion: Quartz glass

Enclosure in discharge lamp main portion: Argon, mercury, bromine, methyl bromide Working pressure in discharge lamp main portion: 200 atm Material of electrodes: Tungsten Clearance between electrodes: 1.1 mm Rated power of discharge lamp: 200 W AC frequency: 5 kHz Average driving current for high luminance: 3 A Average driving current for low luminance: 2.75 A Modulation frequency for high luminance: 300 Hz Modulation frequency for low luminance: 300 Hz b/a for high luminance: 10% b/a for low luminance: 10%

B/A for high luminance: 50%
B/A for low luminance: 65%

Working Example 2

A light source apparatus generally the same as the working example 1 was built, except for the following differences in conditions.
Average driving current for high luminance: 3 A
Average driving current for low luminance: 2.2 A
Modulation frequency for high luminance: 300 Hz
Modulation frequency for low luminance: 300 Hz
b/a for high luminance: 10%
b/a for low luminance: 10%
B/A for high luminance: 50%
B/A for low luminance: 75%

Working Example 3

A light source apparatus generally the same as the working example 1 was built, except for the following differences in conditions.
Average driving current for high luminance: 3 A
Average driving current for low luminance: 2.5 A
Modulation frequency for high luminance: 300 Hz
Modulation frequency for low luminance: 400 Hz
b/a for high luminance: 10%
b/a for low luminance: 10%
B/A for high luminance: 50%
B/A for low luminance: 40%

Working Example 4

A light source apparatus generally the same as the working example 1 was built, except for the following differences in conditions.
Average driving current for high luminance: 3 A
Average driving current for low luminance: 2.6 A
Modulation frequency for high luminance: 300 Hz
Modulation frequency for low luminance: 400 Hz
b/a for high luminance: 10%
b/a for low luminance: 10%
B/A for high luminance: 50%
B/A for low luminance: 60%

Working Example 5

A light source apparatus generally the same as the working example 1 was built, except for the following differences in conditions.
Average driving current for high luminance: 3 A
Average driving current for low luminance: 2.6 A
Modulation frequency for high luminance: 300 Hz
Modulation frequency for low luminance: 400 Hz
b/a for high luminance: 10%
b/a for low luminance: 15%
B/A for high luminance: 50%
B/A for low luminance: 45%

Working Example 6

A light source apparatus generally the same as the working example 1 was built, except for the following differences in conditions.
Average driving current for high luminance: 3 A
Average driving current for low luminance: 2.65 A
Modulation frequency for high luminance: 300 Hz
Modulation frequency for low luminance: 400 Hz
b/a for high luminance: 10%
b/a for low luminance: 15%
B/A for high luminance: 50%
B/A for low luminance: 55%

Comparative Example 1

A light source apparatus generally the same as the working example 1 was built, except for the following differences in conditions.
Average driving current for high luminance: 3 A
Average driving current for low luminance: 2.2 A
Modulation frequency for high luminance: 300 Hz
Modulation frequency for low luminance: 300 Hz
b/a for high luminance: 10%
b/a for low luminance: 10%
B/A for high luminance: 30%
B/A for low luminance: 30%

Comparative Example 2

A light source apparatus generally the same as the working example 1 was built, except for the following differences in conditions.
Average driving current for high luminance: 3 A
Average driving current for low luminance: 2.5 A
Modulation frequency for high luminance: 300 Hz
Modulation frequency for low luminance: 300 Hz
b/a for high luminance: 10%
b/a for low luminance: 10%
B/A for high luminance: 50%
B/A for low luminance: 50%

Comparative Example 3

A light source apparatus generally the same as the working example 1 was built, except for the following differences in conditions.
Average driving current for high luminance: 3 A
Average driving current for low luminance: 2.3 A
Modulation frequency for high luminance: 300 Hz
Modulation frequency for low luminance: 300 Hz
b/a for high luminance: 10%
b/a for low luminance: 10%
B/A for high luminance: 70%
B/A for low luminance: 70%

Evaluation

The working examples 1 to 6 and the comparative examples 1 to 3 were evaluated as follows. The results are shown in Table below.

Projection

The discharge lamp was turned on for 500 hours, during which the luminance was alternately switched between high luminance and low luminance. Then fluctuation of the clearance between the electrodes was observed.

In Table, "GOOD" means that no fluctuation of the clearance between the electrodes has been observed (projections have effectively grown); "FAIR" means that the fluctuation of the clearance between the electrodes was not more than 10%; and "POOR" means that the projections have not grown to an extent that allows the light source apparatus to be reasonably used (growth of the projections were imperfect).

Anti-Blackening Property

The discharge lamp was turned on and the luminance was alternately switched between high luminance and low luminance. The examples were turned off after 500 hours of operation, and the heated states of the lamps were observed.

In Table, "GOOD" means that no blackening, or only blackening of a negligible level has been observed, and "POOR" means that remarkable blackening has been observed.

TABLE

| | MODULATION FREQUENCY (Hz) | | b/a (%) | | B/A (%) | | ANTI-BLACKENING PROPERTY | PROJECTION |
|---|---|---|---|---|---|---|---|---|
| | HL | LL | HL | LL | HL | LL | | |
| WE1 | 300 | 300 | 10 | 10 | 50 | 65 | GOOD | GOOD |
| WE2 | 300 | 300 | 10 | 10 | 50 | 75 | GOOD | GOOD |
| WE3 | 300 | 400 | 10 | 10 | 50 | 40 | GOOD | GOOD |
| WE4 | 300 | 400 | 10 | 10 | 50 | 60 | GOOD | GOOD |
| WE5 | 300 | 400 | 10 | 15 | 50 | 45 | GOOD | GOOD |
| WE6 | 300 | 400 | 10 | 15 | 50 | 55 | GOOD | GOOD |
| CE1 | 300 | 300 | 10 | 10 | 30 | 30 | GOOD | POOR |
| CE2 | 300 | 300 | 10 | 10 | 50 | 50 | GOOD | FAIR |
| CE3 | 300 | 300 | 10 | 10 | 70 | 70 | GOOD | POOR |

WE = Working Example,
CE = Comparative Example
HL = High Luminance,
LL = Low Luminance As is apparent from Table above, with the working examples 1 to 6 the projections were effectively formed on the tip portion of the electrodes and excellent result was obtained regarding the blackening, regardless of changing the luminance of the discharge lamp (light control) from high to low (and vice versa).

In contrast, with the comparative examples 1 to 3, changing the luminance of the discharge lamp (light control) from high to low (and vice versa) led to failure to form the projections on the electrodes during the low luminance periods, and the clearance between the electrodes was increased.

The entire disclosure of Japanese Patent Application No. 2011-161937, filed Jul. 25, 2011 is expressly incorporated by reference herein.

What is claimed is:

1. A light source apparatus comprising:
a discharge lamp including a light-emitting container having a cavity in which a discharge medium is enclosed, and a pair of electrodes disposed such that respective tip portions thereof oppose each other in the cavity; and
a driving unit that generates a driving current and supplies the driving current to the pair of electrodes,
wherein
the driving unit generates the driving current during a constant driving period by modulating amplitude of alternating current having a frequency higher than 1 kHz and not higher than 10 GHz, such that a first section and a second section in which the amplitude is smaller than in the first section are alternately repeated,
the driving unit is configured so as to control the amplitude of the alternating current to thereby control luminance of the discharge lamp, and
a ratio B/A is temporally changed in a range between 10% and 90% on the basis of the luminance of the discharge lamp, where A represents a total of the period corresponding to one of the first sections and one of the second sections, and B represents the period corresponding to one of the first sections.

2. The light source apparatus according to claim 1, wherein the ratio B/A is set at a value farther from 50% the lower the luminance of the discharge lamp is.

3. The light source apparatus according to claim 1, wherein the ratio B/A is in a range between 45% and 55% when the luminance of the discharge lamp is highest.

4. The light source apparatus according to claim 1, wherein a ratio b/a is constant irrespective of the luminance of the discharge lamp, where "a" represents an average amplitude of the alternating current in the first section, and "b" represents an average amplitude of the alternating current in the second section.

5. The light source apparatus according to claim 1, wherein a modulation frequency is constant irrespective of the luminance of the discharge lamp.

6. The light source apparatus according to claim 1, wherein the amplitude of the alternating current is constant in the first section.

7. The light source apparatus according to claim 1, wherein the amplitude of the alternating current is constant in the second section.

8. The light source apparatus according to claim 1, wherein the frequency of the alternating current is not lower than 1 kHz and not higher than 20 kHz, or not lower than 3 MHz and not higher than 10 GHz.

9. The light source apparatus according to claim 1, wherein a projection is formed on a tip portion of each of the pair of electrodes while the discharge lamp is turned on by the driving current, because of fluctuation of temperature of the pair of electrodes.

10. The light source apparatus according to claim 9, wherein the ratio B/A is set in accordance with the luminance of the discharge lamp, such that the length of the projections remains constant.

11. The light source apparatus according to claim 1, wherein
the driving unit is configured to change the luminance of the discharge lamp, and
the ratio of B/A is changed in conjunction with a change in the luminance of the discharge lamp.

12. The light source apparatus according to claim 11, wherein
the ratio of B/A is changed from a first value during a first luminance to a second value during a second luminance that is lower than the first luminance, the second value being lower than the first value.

13. The light source apparatus according to claim 1, wherein the current alternates a plurality of times during each of the first section and the second section.

14. The light source apparatus according to claim 1, wherein the driving current having the frequency higher than 1 kHz and not higher than 10 GHz is supplied to the discharge lamp during a period in which the arc discharge is generated between the electrodes of the discharge lamp and then the discharge lamp is turned on.

15. The light source apparatus according to claim 1, wherein the luminance of the discharge lamp is one of a magnitude of the driving current and an average value of driving current.

16. A driving method of a discharge lamp including a light-emitting container having a cavity in which a discharge medium is enclosed and a pair of electrodes disposed such that respective tip portions thereof oppose each other in the cavity, the method comprising:

generating an alternating current of a frequency higher than 1 kHz and not higher than 10 GHz during a constant driving period;

controlling amplitude of the alternating current to thereby control luminance of the discharge lamp;

modulating the amplitude of the alternating current during the constant driving period in accordance with the luminance of the discharge lamp thereby generating a driving current, such that a first section and a second section in which the amplitude is smaller than in the first section are alternately repeated, and that a ratio B/A is temporally changed in a range between 10% and 90% on the basis of the luminance of the discharge lamp, where A represents a total of the period corresponding to one of the first sections and one of the second sections, and B represents the period corresponding to one of the first sections; and supplying the driving current to the pair of electrodes.

17. A projector comprising:

a light source apparatus that emits a light;

a modulation unit that modulates the light emitted from the light source apparatus on the basis of image data; and a projecting unit that projects the light modulated by the modulation unit, wherein
the light source apparatus includes:
a discharge lamp including a light-emitting container having a cavity in which a discharge medium is enclosed, and a pair of electrodes disposed such that respective tip portions thereof oppose each other in the cavity; and
a driving unit that generates a driving current and supplies the driving current to the pair of electrodes, the driving unit generates the driving current during a constant driving period by modulating amplitude of alternating current having a frequency higher than 1 kHz and not higher than 10 GHz, such that a first section and a second section in which the amplitude is smaller than in the first section are alternately repeated, the driving unit is configured so as to control the amplitude of the alternating current to thereby control luminance of the discharge lamp, and a ratio B/A is temporally changed in a range between 10% and 90% on the basis of the luminance of the discharge lamp, where A represents a total of the period corresponding to one of the first sections and one of the second sections, and B represents the period corresponding to one of the first sections.

* * * * *